(12) United States Patent
Konsela

(10) Patent No.: US 7,735,848 B2
(45) Date of Patent: Jun. 15, 2010

(54) PINTLE HITCH ADAPTOR FOR DRAWBAR OR DMI BUMPER

(76) Inventor: Dean Konsela, 4232 Madson Rd., Manitowoc, WI (US) 54220

( * ) Notice: Subject to any disclaimer, the term of this patent is extended or adjusted under 35 U.S.C. 154(b) by 0 days.

(21) Appl. No.: 12/315,914

(22) Filed: Dec. 8, 2008

(65) Prior Publication Data
US 2009/0127820 A1    May 21, 2009

Related U.S. Application Data

(62) Division of application No. 11/825,874, filed on Jul. 10, 2007, now Pat. No. 7,478,821, which is a division of application No. 11/080,134, filed on Mar. 15, 2005, now Pat. No. 7,264,261.

(51) Int. Cl.
    B60D 1/02        (2006.01)
(52) U.S. Cl. .................................. 280/416.1; 280/515
(58) Field of Classification Search .............. 280/416.1, 280/507, 515
See application file for complete search history.

(56) References Cited

U.S. PATENT DOCUMENTS

| | | |
|---|---|---|
| 3,522,958 A | 8/1970 | Lusignan |
| 3,730,558 A | 5/1973 | Litzenberger |
| 3,759,548 A | 9/1973 | Kothmann |
| 3,841,664 A | 10/1974 | Anderson |
| 4,394,031 A | 7/1983 | Barton et al. |
| 4,434,996 A | 3/1984 | Wallace |
| 4,568,098 A | 2/1986 | Landry, Jr. |
| 4,783,094 A | 11/1988 | Sands |
| 5,106,114 A | 4/1992 | Haupt |
| 5,193,625 A | 3/1993 | Goll |
| 5,261,687 A | 11/1993 | Bergman |
| 5,332,250 A | 7/1994 | Thorwall et al. |
| 5,725,229 A | 3/1998 | McWethy |
| D409,124 S | 5/1999 | Bank |
| 5,908,201 A | 6/1999 | Van Vleet |
| 6,116,633 A | 9/2000 | Pride |
| 6,139,043 A | 10/2000 | Gries et al. |
| 6,739,402 B1 | 5/2004 | Olson et al. |
| 6,802,523 B1 | 10/2004 | Profitt |
| 2004/0075240 A1 | 4/2004 | Staggs |

OTHER PUBLICATIONS

Buyers, Towing Accessories, Heavy Duty Hooks, Hitches & More, pp. 260-262/2005.
Office Action; Inventor Name: Dean Konsela; Dated: Apr. 14, 2008; U.S. Appl. No. 11/825,874, filed Jul. 10, 2007; pp. 6.
Response to Office Action; Amendment B; Inventor Name: Dean Konsela; Dated: Jun. 11, 2008; U.S. Appl. No. 11/825,874, filed Jul. 10, 2007; pp. 10.

*Primary Examiner*—Kevin Hurley
(74) *Attorney, Agent, or Firm*—Ryan Kromholz & Manion, S.C.

(57) ABSTRACT

A pintle hitch adaptor enables a vehicle equipped with a drawbar or DMI bumper to tow trailers having different towing components. The pintle hitch adaptor comprises a sleeve that fits over arid is held to the drawbar. A pintle hitch is mounted to the sleeve. Aligned holes in the sleeve and the drawbar receive a hitch ball shank. A trailer tongue with a cup or eye engages the ball. A pintle hitch latch locks to prevent disengagement of the trailer tongue cup or eye from the ball. Shoulders on a pintle hitch post prevent: the latch from contacting the cup. Alternately, the ball can be removed, and a tow pin can to used between a hole in the trailer tongue and the drawbar and sleeve holes. A locking screw on the sleeve holds the sleeve and drawbar holes in alignment when the ball is removed.

4 Claims, 4 Drawing Sheets

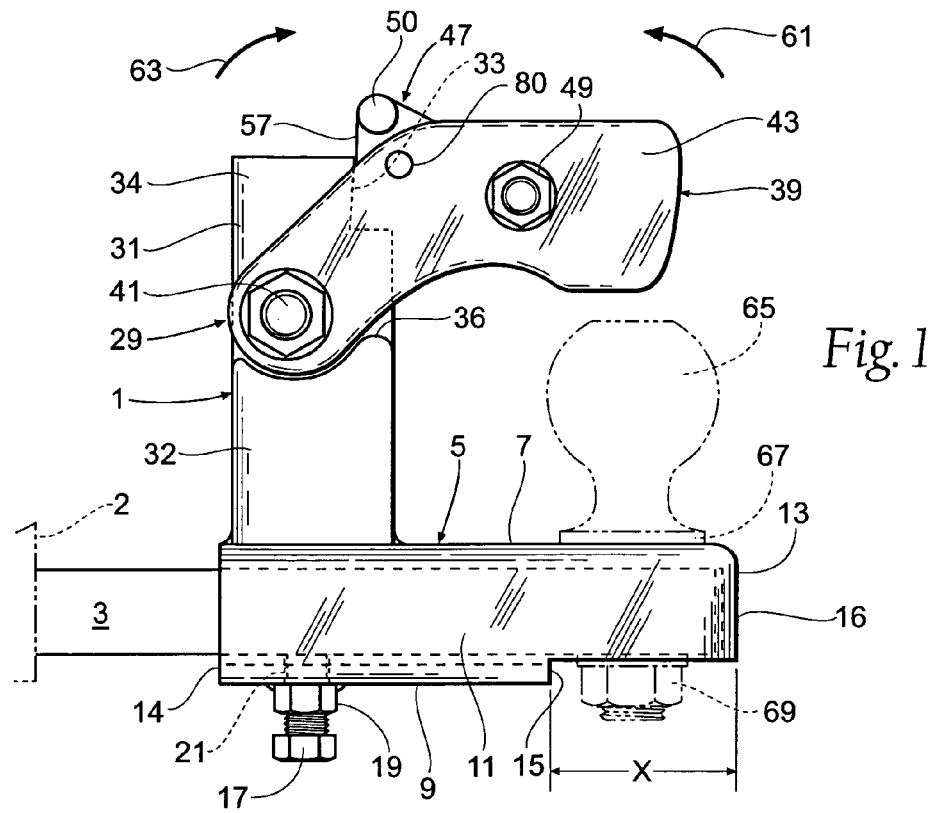
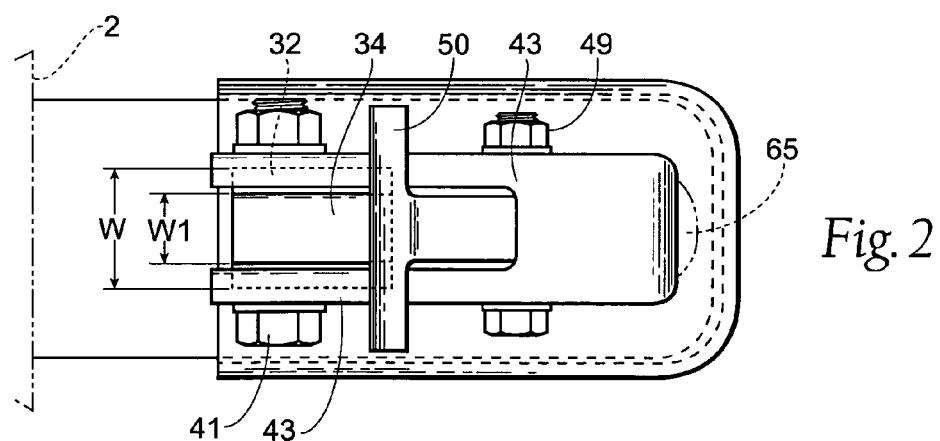
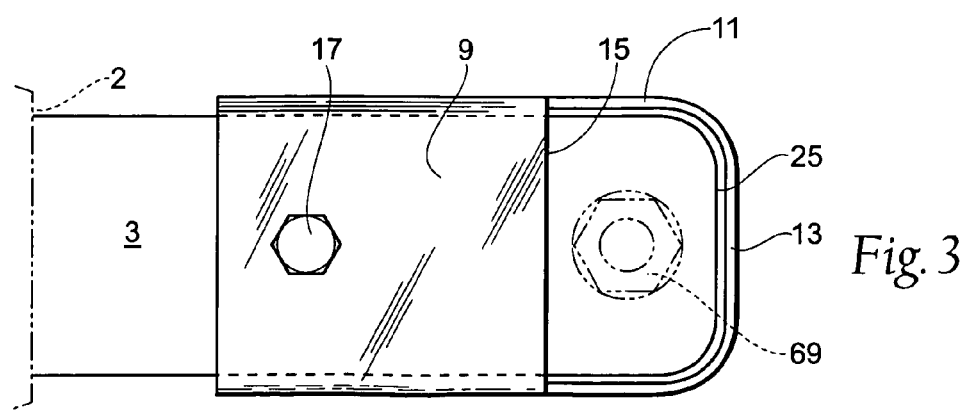
Fig. 1
Fig. 2
Fig. 3

PINTLE HITCH ADAPTOR FOR DRAWBAR OR DMI BUMPER

RELATED APPLICATION

This application is a divisional of U.S. patent application Ser. No. 11/825,874 filed 10 Jul. 2007 now U.S. Pat. No. 7,478,821, which is a divisional of application Ser. No. 11/080,134, filed 15 Mar. 2005, now U.S. Pat. No. 7,264,261 entitled "Pintle Hitch Adaptor for Drawbar or DMI Bumper."

BACKGROUND OF THE INVENTION

1. Field of the Invention

The present invention pertains to towing vehicles, and more particularly to an apparatus that enables a first vehicle equipped with a drawbar to tow a second vehicle equipped with any of a variety of towing components.

2. Description of the Related Art

Various kinds of apparatus have been developed to tow trailers. A typical towing vehicle and trailer have complementary components that are engaged during a towing operation, and that are disengaged when the towing vehicle operates without a trailer.

Generally speaking, there are three major types of towing apparatus. The first type is called herein a simple receiver hitch. It comprises a receiver that is more or less permanently installed on the towing vehicle. The receiver is usually in the form of a longitudinally extending tube near the back end of the towing vehicle. One end of a shank is removably insertable into the receiver. A pin passing through the receiver and the shank retains the shank in the receiver. A second end of the shank protrudes from the receiver and is equipped with a hitch ball. The trailer has a cup, usually at the end of a tongue, that fits over the ball. A mechanism in the cup releasably locks the cup to the ball. Releasing the cup from the ball disengages the towing and trailers from each other. The strength of the entire simple receiver hitch system is limited by the strength of the pin and of the components that install the receiver to the trailer. Normally, the simple receiver hitch is limited to relatively small trailers, such as small boat and utility trailers.

Another type of towing apparatus is a pintle hitch, which is installed on a towing vehicle. A first kind of pintle hitch is comprised of a vertically oriented base with an upwardly oriented hook. Hinged to the base above the hook is a latch. The trailer has a tongue with an eye that fits over the hook. The latch is releasably lockable close to the hook tip to prevent the trailer eye from unintentionally disengaging from the hook. U.S. Pat. No. 5,332,250 teaches a typical hook kind of pintle hitch. Others are marketed by Northern Tool & Equipment Co. of Menomonee Falls, Wis.

A second kind of pintle hitch uses a hitch ball instead of a hook. The trailer may have an eye that engages the ball. The pintle hitch latch is lockable over the ball to prevent the trailer eye from unintentionally disengaging from the ball. Alternately, the trailer may be equipped with a cup that fits over and releasably locks to the ball. In that situation, the pintle hitch latch rests on but does not lock over the trailer cup. The latch therefore rubs and wears on the cup. U.S. Pat. No. 4,434,996 shows both the first and second kinds of pintle hitch.

The pintle hitch is generally considered to be stronger than the simple receiver hitch. However, a major problem with the pintle hitch is the difficulty in installing it to a towing vehicle. For maximum benefit of the pintle hitch, it is often fastened to a vertical surface of the towing vehicle frame. Doing so is not an easy task. Properly aligned holes must be drilled into the towing vehicle frame. Because the pintle hitch is heavy, it is difficult to hold in place while laying out the mounting holes. Even if a template is used, the installation process is cumbersome and time consuming. Further, there are significant safety concerns involved. The fasteners may be over-torqued or under-torqued. The fasteners may rust, thus both compromising their strength and making the pintle hitch difficult to remove. Drilling holes in the towing vehicle frame tends to weaken it. The overall capacity of the pintle hitch system is thus limited by the joint and fasteners between the pintle hitch and the towing vehicle.

In an attempt to ease the task of installing a pintle hitch to a towing vehicle, it is known to provide an adaptor that utilizes a receiver on the towing vehicle. The adaptor has a vertical mounting plate with pre-drilled holes to which the pintle hitch is fastened. The adaptor has a shank that is insertable into the receiver. A typical adaptor may be seen in the catalog of Northern Tool & Equipment Co. Although the adaptor simplifies the installation procedure, the entire system is limited in capacity by the strength and integrity of the fasteners between the receiver and the towing vehicle, by the fasteners between the pintle hitch and the adaptor, and by the pin between the receiver and the adaptor shank. In addition, it is known for the mounting plate to break, thus putting the trailer in the ditch.

U.S. Pat. No. 6,139,043 ('043 patent) describes a one-piece shank and pintle hitch. The shank is removeably insertable into a towing vehicle receiver. The one-piece hitch of the '043 patent eliminates the problem of a joint with fasteners between a pintle hitch and a vertical installation surface. Nevertheless, the capacity of the system is limited by the strength of the retaining pin between the shank and the towing vehicle receiver.

Other kinds of pintle hitches may be seen in U.S. Pat. Nos. 5,106,114 and 4,568,098.

The third major type of towing apparatus is a drawbar. Drawbars may be fixed to a towing vehicle, such as an agricultural tractor. Alternately, the drawbar may have limited motion relative to the towing vehicle, such as the drawbars of well know DMI bumpers. Drawbars are invariably horizontally oriented, and they have relatively large holes through them. A tow pin passes through the drawbar hole and a similar hole in a trailer tongue to engage the towed and towing vehicles. It is generally agreed that drawbars are the strongest and safest towing component for a towing vehicle. However, the tow pin and hole design for engaging a trailer is of rather limited usefulness. Versatility is an advantage of pintle hitches that is lacking in drawbars.

A major disadvantage of prior towing apparatus is related to the number of components that are required to suit different trailers. For the receiver type towing apparatus, one style of component is required for use with a hitch ball, while a different component is required for use with a pintle hitch. Thus, three different towing vehicle components are needed to suit just two types of towing apparatus. In fact, a third component is needed if a trailer is to be towed using a tow pin.

Thus, a need exists for improvement to towing apparatus.

SUMMARY OF THE INVENTION

In accordance with the present invention, a pintle hitch adaptor is provided that enables a vehicle equipped with a drawbar or DMI bumper to tow trailers having any of a variety of towing components. This is accomplished by a novel apparatus that includes a sleeve that fits over the drawbar and a pintle hitch mounted on the sleeve.

The sleeve is preferably sized and shaped to fit over a drawbar of an agricultural tractor, DMI bumper, or other similarly equipped vehicle. A lock screw on the sleeve bears against the drawbar and holds the sleeve at a desired location on it. There is a relatively large hole through a first end of the sleeve.

The pintle hitch is mounted on the second end of the sleeve. The pintle hitch is comprised of an upstanding post, to which is hinged a latch. The latch is pivotable between locked and open positions. A lever rotatable in the latch is used to selectively lock the latch in its locked position and to unlock the latch so it can be rotated to its open position.

In use, the sleeve of the adaptor is installed over the drawbar of a DMI bumper or agricultural tractor. The hole in the sleeve is aligned with the hole in the drawbar. The pintle hitch latch is rotated to its open position. The shank of a conventional hitch ball is passed through the holes in the sleeve and the drawbar and held in place with lockwasher and nut. The locking screw on the sleeve is tightened against the drawbar. The pintle hitch with the ball is then ready to tow a vehicle.

The trailer may have a cup that engages the hitch ball. It is a feature of the invention that the latch working end does not contact the trailer cup when the latch is in its locked position. Consequently, the latch does not wear on the cup during use. Alternately, the trailer may have an eye that engages the pintle hitch ball. Rotating the latch to its locked position prevents the trailer eye from unintentionally disengaging from the ball.

After a towing operation in which the hitch ball on the pintle hitch has been used to engage the trailer, it may be desirable to use the towing vehicle to tow a vehicle without using the ball. In that case, the ball is removed from the pintle hitch and drawbar. The aligned holes in the adaptor and drawbar are thus exposed for receiving a towing pin. The locking screw holds the adaptor sleeve at the proper location on the drawbar such that the ball is easily replaced when desired.

The method and apparatus of the invention, using a sleeve with a pintle hitch mounted on it, thus combines the versatility of a pintle hitch with the strength of a drawbar for towing operations. The probability of the adaptor being unable to tow a particular vehicle is remote, even though the adaptor can be removed from the towing vehicle for some towing operations.

Other advantages, benefits, and features of the invention will become apparent to those skilled in the art upon reading the detailed description of the invention and studying the drawings.

BRIEF DESCRIPTION OF THE DRAWINGS

FIG. 1 is a side view of the pintle hitch adaptor of the present invention with the latch thereof in the locked position.

FIG. 2 is a top view of the pintle hitch adaptor of the invention.

FIG. 3 is a bottom view of the pintle hitch adaptor of the present invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 8:
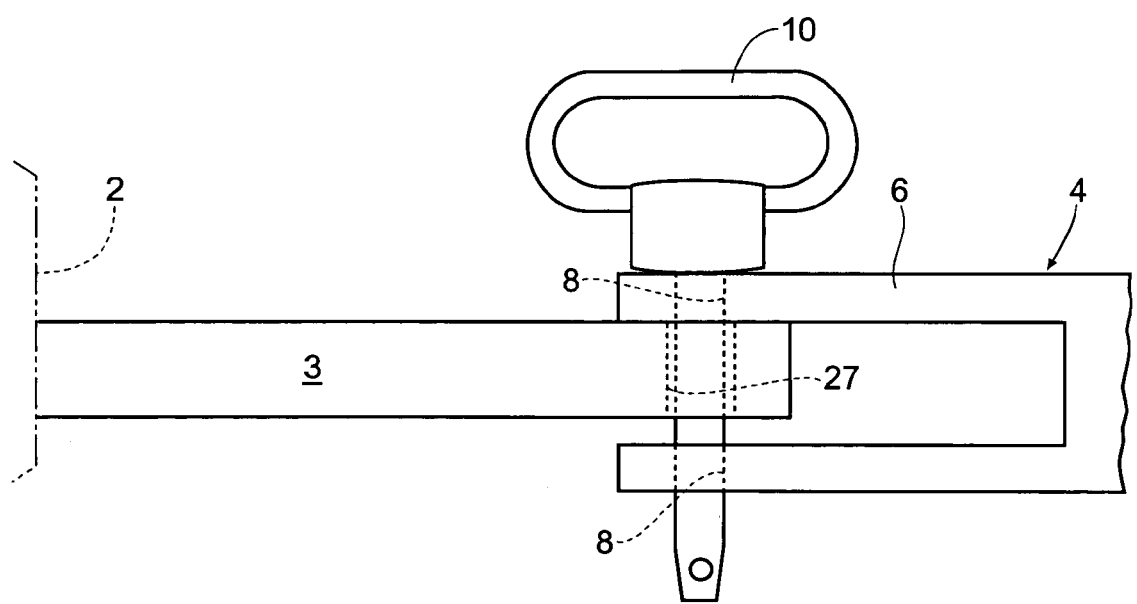
FIG. 8 is a side view showing a conventional way of towing a trailer by means of a drawbar on the towing vehicle.

Referring first to FIG. 8, a conventional way of towing a trailer 4 with a towing vehicle 2 equipped with a drawbar 3 is shown. The drawbar 3 has a hole 27 through it. The trailer 4 has a tongue 6 with similar holes 8. In towing configuration, the tongue 6 is located over the drawbar 3 such that the holes 8 and 27 align. Then a tow pin 10 is dropped through the aligned holes, 8 and 27.

Next looking at FIGS. 1-4, a pintle hitch adaptor 1 is illustrated that includes the present invention. The pintle hitch adaptor 1 is particularly useful for enabling the towing vehicle 2 equipped with the drawbar 3 to tow a trailer (not seen in these views) by means other than the towing pin 10 of FIG. 8. However, it will be understood that the invention is not limited to vehicle related applications.

The drawbar 3 of the towing vehicle 2 to be used with the present invention is conventional. Drawbars 3 are typically found on agricultural tractors (not shown), in which case the drawbar 3 is a permanent and fixed part of the tractor. Alternately, the drawbar 3 may be part of a conventional DMI bumper. In that case, the drawbar 3 is capable of limited sideways motion as well as being spring loaded for limited longitudinal motion relative to the trailer. Near the drawbar free end 25 is hole 27.

The pintle hitch adaptor 1 is preferably comprised of a sleeve 5 having a top wall 7, bottom wall 9, and opposed side walls 11. The sleeve 5 has a back end 14 and a front end 16. Although not required for the proper functioning of the invention, it is preferred that the sleeve 5 also have a front wall 13. As may be seen, the sleeve bottom wall 9 may include a lock screw 17 near the back end 14. For example, a nut 19 may be welded to the sleeve bottom wall 9, with the lock screw 17 threading through the nut 19 and through a hole 21 in the bottom wall 9. Preferably, there is a relatively large hole 23 through the top wall 7 near the front wall 13, see particularly FIGS. 4 and 7. Further, the bottom wall 9 may be cut out for a distance X from the front end 16, such that the bottom wall 9 has a front edge 15. A typical value for the distance X is approximately 2.25 inches.

The adaptor walls 7, 9, and 11 are sized and shaped to enable the sleeve 5 to fit easily over the drawbar 3. When the sleeve front wall 13 is proximate the drawbar free end 25, the sleeve hole 23 is aligned with the drawbar hole 27.

Figure 4:
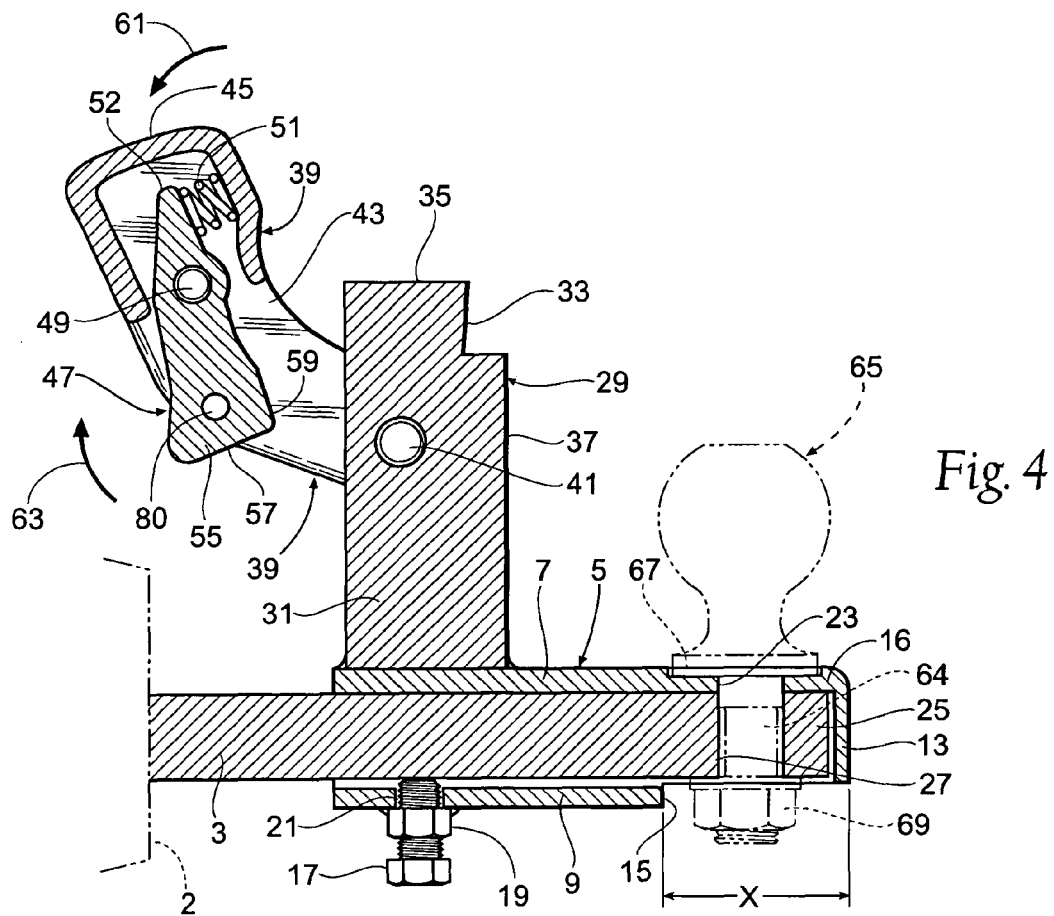
FIG. 4 is longitudinal cross-sectional view of the pintle hitch adaptor showing the latch in the open position.

Upstanding from the adaptor sleeve 5 is a pintle hitch 29. In the illustrated construction, the pintle hitch 29 is comprised of a post 31 welded or otherwise mounted to the sleeve 5. The post 31 may be seen to include a bottom section 32 and a top section 34. As may be seen particularly in FIG. 2, the post 31 has a first width W along its bottom section 32, and a narrower width W1 along its upper section 34. Consequently, there is a shoulder 36 on each side of the post 31. As illustrated in FIG. 4, a notch 33 is provided at the junction of the post top surface 35 and the front surface 37.

Hinged to the post 31 is a latch 39. As illustrated, spaced apart arms 43 of the latch 39 are hinged by such means as the bolt and nut 41 shown. The latch 39 has a working end 45 between the arms 43 opposite the bolt and nut 41.

A lever 47 is rotatable in the latch 39, as by means of the bolt and nut 49 shown. With particular reference to FIG. 4, the lever 47 is seen to have a first end 52 that is inside the latch working end 45, and an opposed second end 55. The second end 55 is composed of a first surface 57, and a second surface 59 that is approximately perpendicular to the first surface 57. A pair of rods 50 extends oppositely from the lever 47 near the second end 55 and outside of the latch 39. A spring 51, or other means, biases the lever 47 to rotate in the direction of arrow 61.

In FIGS. 1 and 2, the latch 39 is shown in a locked position. In that situation, the lever first surface 57 is adjacent the post notch 33 (seen in phantom). The spring 51 retains the lever first surface 57 adjacent the post notch 33. The coaction of the lever 47, post 31, and bolt and nut 49 prevent the latch 39 from opening in the direction of arrow 61. To open the latch 39, a person pushes the rods 50 in the direction of arrow 63 against the spring 51. That action rotates the lever 47 in the direction of arrow 63 and removes the lever first surface 57 from the vicinity of the notch 33. Consequently, the latch 39 is able to pivot in the direction of arrow 61 to the open position seen in FIG. 4. When the latch 39 is pivoted back in the direction of arrow 61, the lever second surface 59 contacts the post upper surface 35 to rotate the lever against the spring 51 and enable the lever second surface 59 to slide along the post upper surface 35 until the lever first surface 57 is at the post notch 33. At that point the latch spring 51 rotates the lever 47 such that the first surface 57 falls to again be adjacent the post notch 33, see particularly FIGS. 1 and 2.

The pintle hitch adaptor 1 enables a vehicle 2 equipped with the drawbar 3 to tow trailers other than those having a tongue 6 with holes 8 (FIG. 8). In FIGS. 1-4, the pintle hitch adaptor is installed on a drawbar 3 with the sleeve hole 23 aligned with the drawbar hole 27. The pintle hitch adaptor locking screw 17 is tightened. As seen in phantom, the shank 64 of a hitch ball 65, which may be conventional, is passed through the holes 23 and 27, with a flange 67 of the ball resting on the sleeve top wall 7. The ball 65 is held in place with a lock washer and nut 69.

Figure 5:
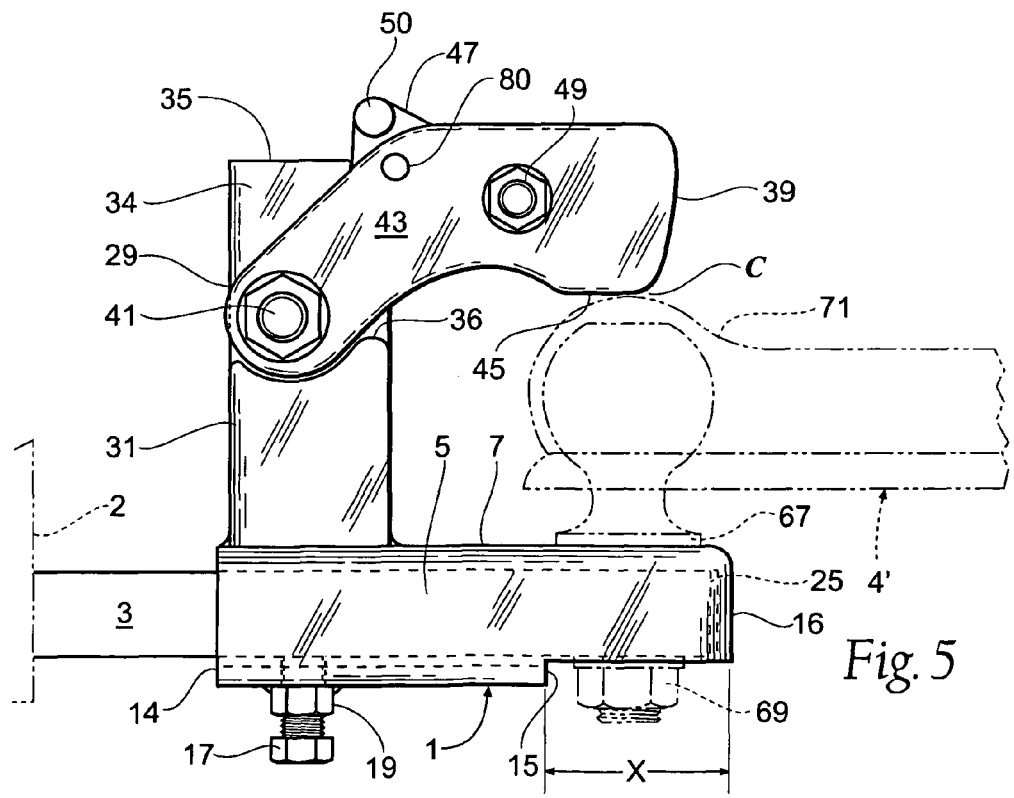
FIG. 5 is a view similar to FIG. 1, but showing a trailer with a cup that engages the pintle hitch adaptor hitch ball.

In FIG. 5, a cup 71 is shown engaging the hitch ball 65 (shown in phantom). The cup 71 is commonly used at the end of a tongue of a trailer 4', and is well known in the art. To enable the cup 71 to engage the ball 65, the pintle hitch adaptor latch 39 is first opened, as shown and described in connection with FIG. 4. After the cup 71 is engaged with the ball 65, the latch 39 is locked. It is a feature of the invention that the latch working end 45 does not contact the cup 71 during operation. Instead the latch arms 43 contact the post shoulders 36 to limit pivoting of the latch 39. When the latch 39 is in its locked position, there is a clearance C between the latch working end 45 and the cup 71. Accordingly, the latch 39 does not wear on the cup 71 during use. After the towing operation, the latch 39 is opened as previously described, and the cup 71 is disengaged from the ball 65 in known manner.

According to another aspect of the invention, the hitch ball 65 is removable from the pintle hitch adaptor 1 and the drawbar 3. Because of the locking screw 17, the pintle hitch adaptor 1 and drawbar holes 23 and 27, respectively, remain aligned. In that manner, the pintle hitch adaptor 1 and drawbar 3 remain ready for later use with a ball 65 without any adjustment needed of the pintle hitch adaptor 1 on the drawbar 3.

Figure 6:
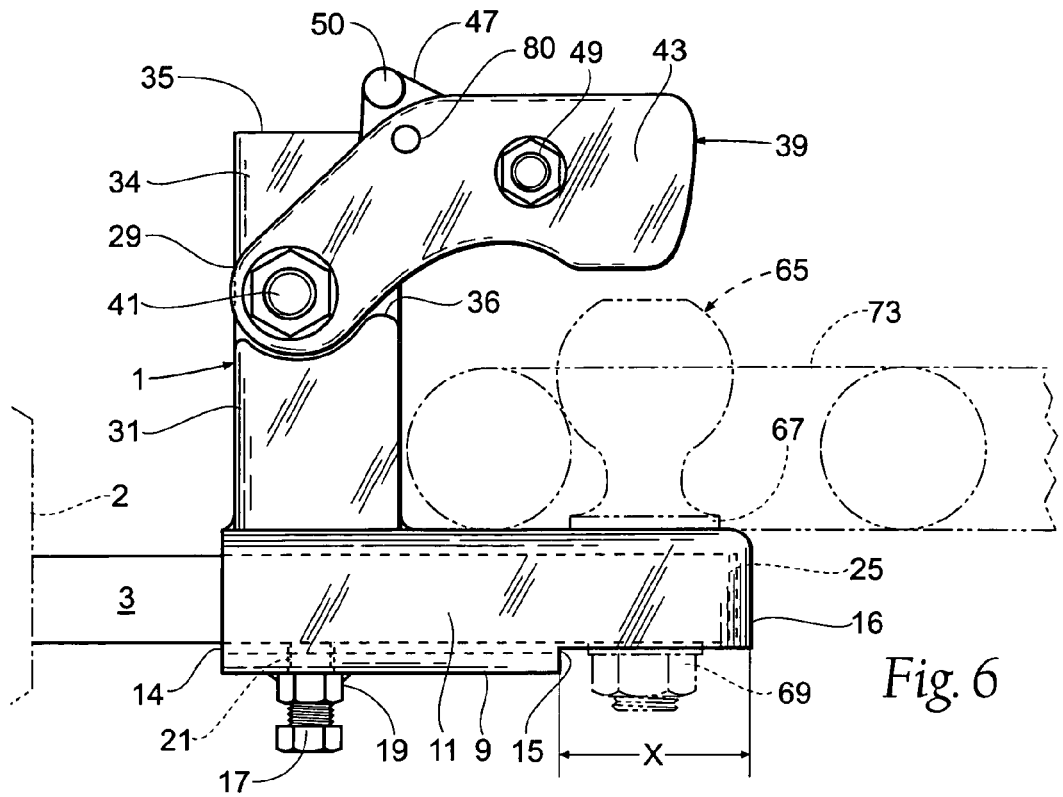
FIG. 6 is a view showing a trailer with an eye that engages the pintle hitch adaptor hitch ball.

The versatility of the pintle hitch adaptor 1 is further demonstrated in FIG. 6. As is illustrated in phantom, a trailer having a tongue with an eye 73 is towable by means of the pintle hitch adaptor 1 and drawbar 3. The eye 73 engages over the hitch ball 65 and is prevented from disengaging by the locked latch 39.

Figure 7:
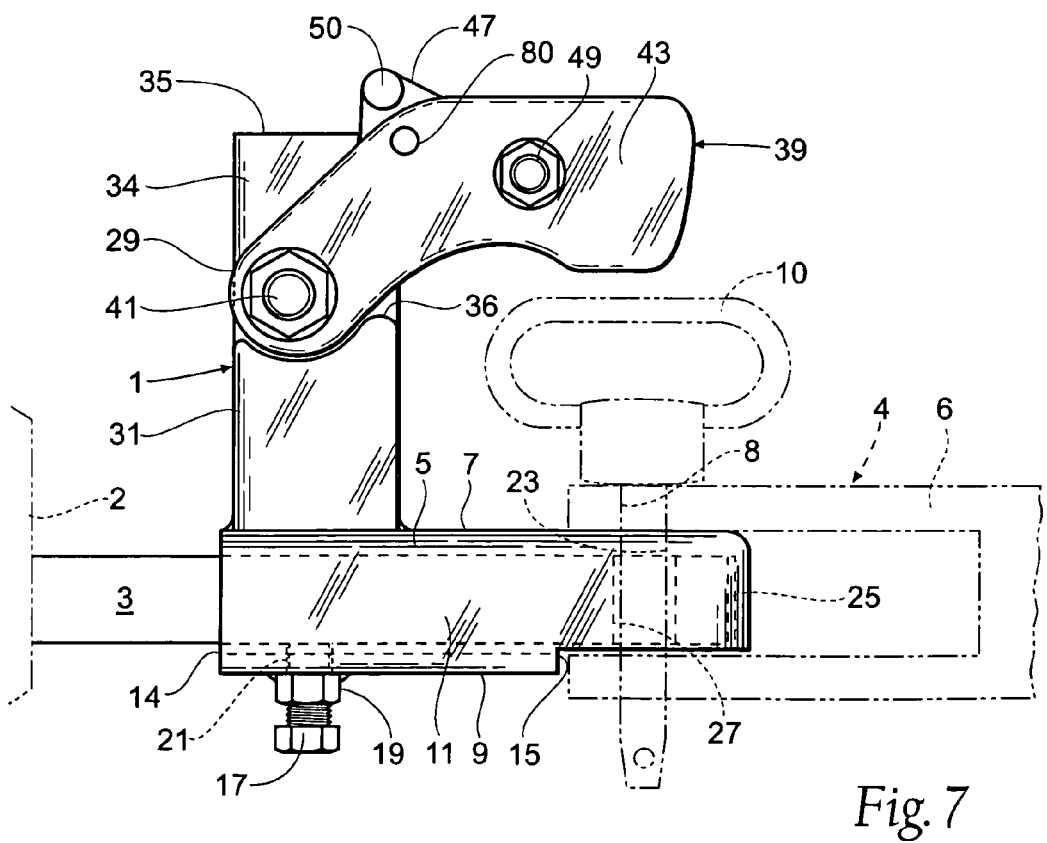
FIG. 7 is a view showing the pintle hitch adaptor in use to tow a trailer by means of a tow pin.

Further in accordance with the present invention, a trailer 4 having a conventional tongue 6 (FIG. 8) is towable when the pintle hitch adaptor 1 is installed on the drawbar 3. FIG. 7 shows a pintle hitch adaptor 1 installed on the drawbar 3, but no hitch ball 65 is used. After the latch 39 is pivoted to the open position, illustrated in FIG. 4, the trailer tongue 6 is maneuvered such that its holes 8 are aligned with the pintle hitch adaptor 1 and drawbar holes 23 and 27, respectively. In this configuration, a tow pin 10, or other similar device, is dropped through the aligned holes 8, 23, and 27. The latch 39 is pivoted to its locked position. The trailer 4 is then towable in the manner seen in FIG. 8, but with the latch 39 preventing the tow pin 10 from bouncing out of the holes 8, 23, 27. The locking screw 17 holds the pintle hitch adaptor 1 in proper place on the drawbar 3 such that a hitch ball 65 is easily usable again at a later time without having to realign the holes 23 and 27. Further, the lever 47 of the pintle hitch adaptor 1 may be supplied with an aperture 80 for receiving a safety clip or other device (not shown) to thereby provide added security in maintaining the lever 47 in closed position.

In summary, the results and advantages of trailers 4 can now be more fully realized. The pintle hitch adaptor 1 provides both versatility to a conventional drawbar 3 as well as improved safety in the connection between the towing vehicles and trailers. This desirable result comes from using the combined functions of the sleeve 5. The sleeve may be used without a hitch ball 65. With the ball 65, a trailer having a cup 71 or an eye 73 is towable. The latch 39 is selectively openable and lockable to allow engagement and prevent disengagement, respectively, of the trailer 4 from the ball 65. The ball 65 is removable from the pintle hitch adaptor 1 to enable the drawbar 3 to function in the same manner as if the pintle hitch adaptor 1 were not present.

It will also be recognized that in addition to the superior performance of the pintle hitch adaptor 1, its construction is such as to be of modest cost in relation to the benefits it provides. In fact, the increased productivity and versatility that the pintle hitch adaptor 1 provides to a towing vehicle 2 equipped with a drawbar quickly recoups the initial cost.

Thus, it is apparent that there has been provided, in accordance with the invention, a pintle hitch adaptor 1 that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In combination with a towing vehicle having a drawbar integral with the towing vehicle or part of a DMI bumper, the drawbar having a first hole therethrough,
   a. a pintle hitch adaptor installed on the drawbar and having a sleeve with a second hole therethrough, and a pintle hitch mounted on the sleeve;
   b. a trailer having a tongue; and
   c. means for cooperating with the first and second holes and the trailer tongue to tow the trailer by the towing vehicle, wherein the means for cooperating with the first and second holes and the trailer tongue comprises a tow pin that passes through the first and second holes and through the trailer tongue.

2. In combination with a towing vehicle having a drawbar integral with the towing vehicle or part of a DMI bumper, the drawbar having a first hole therethrough,
   a. a pintle hitch adaptor installed on the drawbar and having a sleeve with a second hole therethrough, and a pintle hitch mounted on the sleeve;
   b. a trailer having a tongue; and
   c. means for cooperating with the first and second holes and the trailer tongue to tow the trailer by the towing vehicle, wherein the means for cooperating with the first and second holes and the trailer tongue comprises:
  i. a hitch ball having a shank that passes through the first and second holes; and
  ii. an eye on the trailer tongue that selectively engages the hitch ball.

3. In combination with a towing vehicle having a drawbar integral with the towing vehicle or part of a DMI bumper, the drawbar having a first hole therethrough,
  a. a pintle hitch adaptor installed on the drawbar and having a sleeve with a second hole therethrough, and a pintle hitch mounted on the sleeve, wherein the pintle hitch comprises:
    i. a post upstanding from the sleeve; and
    ii. a latch rotatable on the post between open and locked positions, the latch cooperating with the post and the means for cooperating with the first and second holes and the trailer tongue to assure the towing vehicle and trailer remain in operative towing association;
  b. a trailer having a tongue; and
  c. means for cooperating with the first and second holes and the trailer tongue to tow the trailer by the towing vehicle.

4. In combination with a towing vehicle having a drawbar integral with the towing vehicle or part of a DMI bumper, the drawbar having a first hole therethrough,
  a. a pintle hitch adaptor installed on the drawbar and having a sleeve with a second hole therethrough, and a pintle hitch mounted on the sleeve;
  b. a trailer having a tongue; and
  c. means for cooperating with the first and second holes and the trailer tongue to tow the trailer by the towing vehicle, wherein:
    the means for cooperating with the first and second holes and the trailer tongue comprises:
      i. a hitch ball having a shank that passes through the first and second holes; and
      ii. a cup on the trailer tongue that selectively engages the hitch ball; and
    the pintle hitch comprises:
      i. a post upstanding from the sleeve and having at least one shoulder thereon; and
      ii. a latch rotatable on the post between open and locked positions, the latch contacting the post at least one shoulder when in the locked position thereof to provide a predetermined clearance between the latch and the cup on the trailer tongue, so that the latch does not wear on the cup on the trailer tongue.

\* \* \* \* \*